US012380220B2

United States Patent
Ramanan et al.

(10) Patent No.: US 12,380,220 B2
(45) Date of Patent: Aug. 5, 2025

(54) AUTOMATED ATTRIBUTE SCRAPING FOR SECURITY FEATURE IMPLEMENTATION PREDICTION

(71) Applicant: Palo Alto Networks, Inc., Santa Clara, CA (US)

(72) Inventors: Nandini Ramanan, Sunnyvale, CA (US); William Redington Hewlett, II, Mountain View, CA (US); Manish Mradul, Milpitas, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 256 days.

(21) Appl. No.: 18/177,258

(22) Filed: Mar. 2, 2023

(65) Prior Publication Data

US 2024/0296231 A1    Sep. 5, 2024

(51) Int. Cl.
    *G06F 21/00*     (2013.01)
    *G06F 16/953*     (2019.01)
    *G06F 21/57*     (2013.01)

(52) U.S. Cl.
    CPC .......... *G06F 21/577* (2013.01); *G06F 16/953* (2019.01); *G06F 2221/034* (2013.01)

(58) Field of Classification Search
    CPC . G06F 2221/034; G06F 16/953; G06F 21/577
    USPC ....................................................... 726/25
See application file for complete search history.

(56) References Cited

U.S. PATENT DOCUMENTS

| | | | | |
|---|---|---|---|---|
| 2017/0099291 A1* | 4/2017 | Clark | ................. | H04L 63/126 |
| 2019/0379683 A1* | 12/2019 | Overby | ............... | G06F 9/45533 |
| 2023/0169395 A1* | 6/2023 | Pogde | .................... | G06N 20/00 |
| | | | | 706/12 |

FOREIGN PATENT DOCUMENTS

| | | | | |
|---|---|---|---|---|
| CN | 106021252 | * | 10/2016 | ............ G06F 17/30 |
| CN | 108039943 | * | 5/2018 | ............... H04L 9/00 |
| JP | 2016158173 | * | 9/2016 | ............ H04M 11/00 |

* cited by examiner

*Primary Examiner* — Josnel Jeudy
(74) *Attorney, Agent, or Firm* — Gilliam IP PLLC

(57) ABSTRACT

Automated attribute scraping for security feature implementation with a single trained machine model across security features improves prediction quality and efficiency of predictions. A security feature implementation prediction system (system) generates search engine queries for each security feature based on high importance tokens for the security feature. The system ranks URLs returned from each search engine query for relevance, then preprocess and inputs content for top-ranked URLs into the trained machine learning models. The system identifies implemented security features output based on confidence values output by the trained machine learning model and identifies sentences that describe the implementations in corresponding content for top-ranked URLs.

23 Claims, 8 Drawing Sheets

AUTOMATED ATTRIBUTE SCRAPING FOR SECURITY FEATURE IMPLEMENTATION PREDICTION

BACKGROUND

The disclosure generally relates to CPC class G06F and subclass 21/50 and/or 21/56.

Software-as-a-Service (SaaS) applications implement security features that reduce security risk across multiple attack vectors such as access management, data retention, policy misconfiguration, data breach, etc. Specific types of implementations and strength of implementations for each of these security features varies across SaaS applications. SaaS applications typically describe implementations of security features in public facing documents such as data sheets, product application programming interface (API) documentation, etc. to make users aware of the implemented security features and how to use/manage them.

BRIEF DESCRIPTION OF THE DRAWINGS

Embodiments of the disclosure may be better understood by referencing the accompanying drawings.

DESCRIPTION

Figure 1:
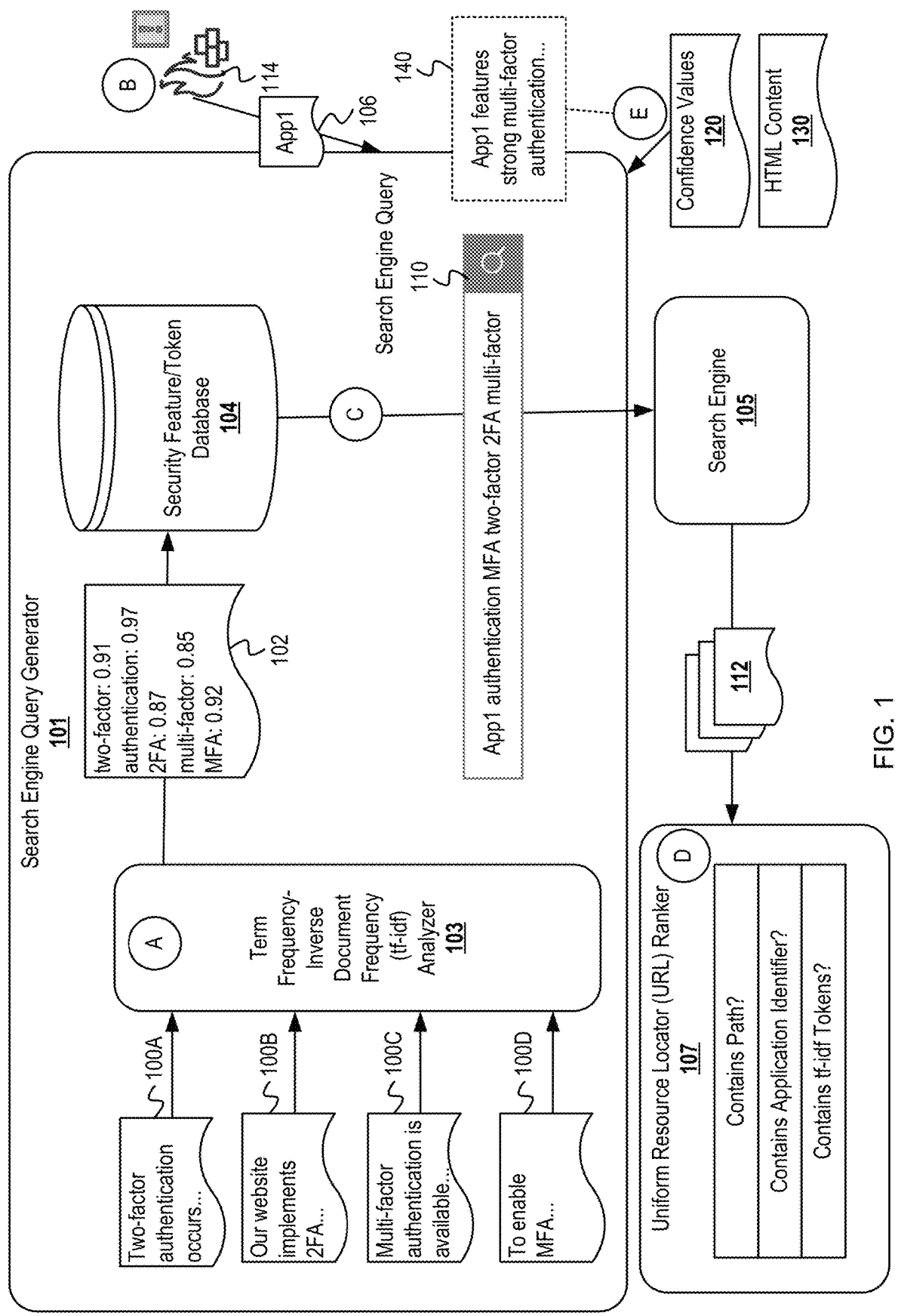
FIG. 1 is a schematic diagram of an example system for determining importance of tokens relative to a security feature and ranking URLs returned from an intelligent query based on the important tokens and an identifier of a SaaS application.

The description that follows includes example systems, methods, techniques, and program flows to aid in understanding the disclosure and not to limit claim scope. Well-known instruction instances, protocols, structures, and techniques have not been shown in detail for conciseness.

Overview

Proliferation of SaaS application usage poses security risks, as SaaS applications have varying levels of risk associated with the available security features such as data retention policies, encryption at rest, and multi-factor authentication. Lack of implementation for these security features poses a distinct security exposure to users running the SaaS application and, as such, begets an evaluation of confidence that the SaaS application implements each security feature. Based on detection of a SaaS application running at an endpoint device, typical firewalls evaluate each security feature separately, leading to inefficiency in deployment of predictive models for each security feature and loss of learning quality in the predictive models by omitting data across multiple security features for security features that are potentially correlated. An automated pipeline disclosed herein intelligently generates security engine queries for each of a list of security features and a SaaS application, ranks uniform resource locators (URLs) returned from the queries for relevance to each respective security feature, and evaluates HyperText Transfer Protocol (HTTP) responses from relevant URLs with a machine learning model trained to predict confidence values that the SaaS application implements each security feature simultaneously on data across security features.

Prior to deployment of the machine learning model, a search engine query generator (hereinafter simply "generator") identifies important tokens for each security feature via term frequency-inverse document frequency (tf-idf) statistics of tokens extracted from documents related to each security feature. The documents correspond to webpages for trusted applications with implementations of respective security features that are known to be secure. Subsequently, a trainer uses the documents and corresponding SaaS application identifiers as training data for the machine learning model, with labels comprising vectors with each entry indicating whether a corresponding feature is implemented.

Once the machine learning model is trained, the pipeline is triggered when a firewall detects a previously unseen SaaS application identifier or an identifier for a SaaS application with unknown implementation of one or more security features. The generator uses the identifier in combination with tokens for each security feature to generate intelligent queries to a search engine. A URL ranker evaluates each set of URLs returned by the search engine from each query for quality and relevance to the corresponding security feature. An HTML parser/natural language processor preprocesses HTTP responses from each of the top-ranked URLs for each security feature/query to input to the trained machine learning model. Each input to the trained machine learning model generates a vector of confidence values indicative of confidence that the SaaS application implements each of the security features. Security features with at least one confidence value among the vectors output by the trained machine learning model above a threshold are indicated as low-risk, and security features without confidence values above the threshold are indicated as high-risk with levels of severity according to corresponding security features. The firewall generates an overall risk value for the SaaS application according to the confidence values for each security feature weighted by relative importance. Additionally, the generator analyzes HTML content returns from URLs for security features implemented by the SaaS application and, based on matching high-importance tokens for the implemented security features with sentences in HTML content for those security features, indicates each sentence as describing implementation of the corresponding security feature for the SaaS application. This automated pipeline generates a high-quality machine learning model for prediction of confidence values of security features for a SaaS application and high-quality inputs to the machine learning model from intelligent queries and URL evaluation.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Illustrations

FIG. 1 is a schematic diagram of an example system for determining importance of tokens relative to a security feature and ranking URLs returned from an intelligent query based on the important tokens and an identifier of a SaaS application. Note that while the operations in FIG. 1 are depicted for a single feature for simplicity and ease of exposition, these operations are performed for all security features being tracked for implementation in SaaS applications. Additional security features to multi-factor authentication depicted in FIG. 1 include data retention policies, encryption at rest, etc. Security features refers to any software feature related to cybersecurity.

Figure 2:
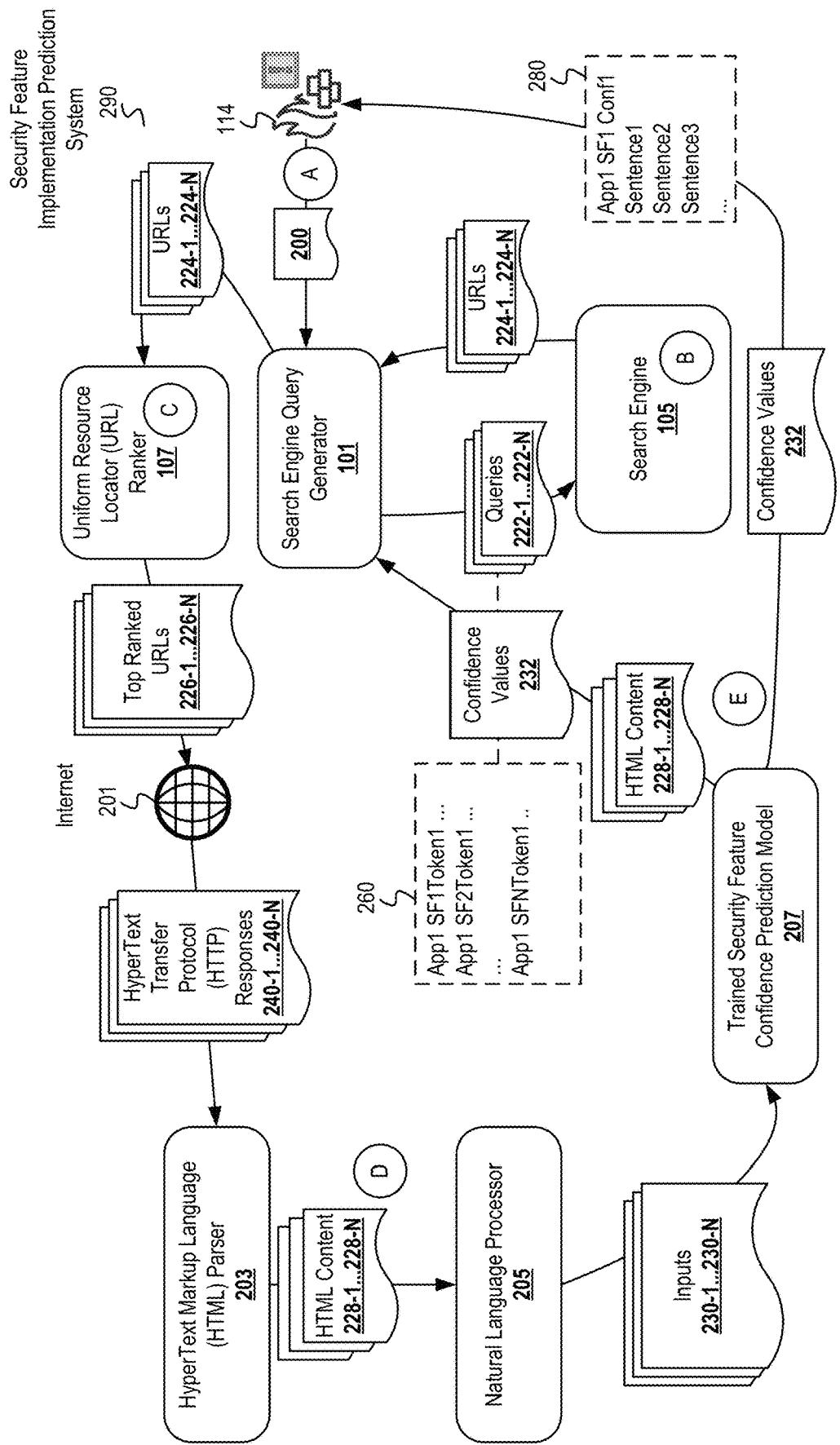
FIG. 2 is a schematic diagram of an example system for determining confidence values for implementation of security features by a detected applications using intelligently queried and ranked URLs and a machine learning model.

A search engine query generator (generator) 101 determines tokens with high tf-idf statistics in documents of security features. Subsequently, when a firewall 114 detects an identifier 106, the generator 101 generates a search engine query for the identifier 106 and each security feature according to the tokens with high tf-idf statistics. A search engine 105 returns URLs from each query that a URL ranker 107 ranks according to criteria for URLs being likely to correspond to webpages of content with high relevance for the corresponding SaaS application and security feature. Subsequently, the top-ranked URLs are scraped and the corresponding HTML content 130 is classified by a trained machine learning model to generate confidence values 120 that the SaaS application corresponding to the identifier 106 implements each of the security features. The generator 101 receives the HTML content 130 and confidence values 120 and, based on detecting important tokens for each security feature in the corresponding HTML content of the HTML content 130, identifies sentences that indicate implementation of each security feature implemented by the SaaS application. Operations for scraping URLs and classifying HTML content returned from each scraped URL with a trained machine learning model are depicted in FIG. 2.

FIG. 1 is annotated with a series of letters A-E. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, a tf-idf analyzer 103 receives documents such as documents 100A-100D. The tf-idf analyzer 103 tokenizes and computes tf-idf of tokens in the documents 100A-100D to generate example tf-idf statistics 102. In this example, the documents 100A-100D relate to the multi-factor authentication (MFA) security feature and the important tokens are synonyms for or abbreviations of synonyms for MFA. The relevant documents for each security feature such as documents 100A-100D are selected by a domain-level expert as being trusted documents describing the security feature. Document 100A comprises the sentence "Two-factor authentication occurs . . . ", document 100B comprises the sentence "Our website implements 2FA . . . ", document 100C comprises the sentence "Multi-factor authentication is available . . . ", and document 100D comprises the sentence "To enable MFA . . . ". For these example documents, the tf-idf analyzer 103 computes the following example tf-idf statistics 102 for tokens in documents 100A-100D:

two-factor: 0.91
authentication: 0.97
2FA: 0.87
multi-factor: 0.85
MFA: 0.92

These high tf-idf statistics indicate that each of these tokens is important for describing content in the documents 100A-100D. Note that each of these tokens is included in a search engine query because webpages can describe MFA using any of these synonyms and abbreviations.

The tf-idf analyzer 103 determines a subset of tokens in the documents 100A-100D such as the above tokens to associate with the security feature. The tf-idf analyzer 103 selects tokens associated with the security feature to store in a security feature/token database 104 according to tf-idf statistics computed for tokens in documents corresponding to the security feature. To exemplify, the tf-idf analyzer 103 can choose tokens with tf-idf statistics above a threshold, can choose a threshold number of tokens with highest tf-idf statistics, etc. The security feature/token database 104 receives tokens such as the tokens indicated in example tf-idf statistics 102 and stores the tokens in association with an indication of the security feature for documents 100A-100D (in this instance, MFA) and, optionally, in association with their corresponding tf-idf statistics.

Stage A is depicted for an example security feature, MFA, for illustrative purposes. The operations at Stage A occur for each security feature for which SaaS applications are being evaluated. Operations for distinct security features can occur simultaneously for multiple security features as documents corresponding to those security features are collected. Document aggregation for each security feature can be automated, for instance by a machine learning model trained to detect context of documents.

At stage B, the firewall 114 detects a SaaS application with the identifier 106 "App1" and communicates the identifier 106 to the generator 101. The firewall 114 can detect the SaaS application by detecting processes corresponding to the SaaS application on an endpoint device and determining that the identifier 106 of the SaaS application corresponding to the detected processes is not on an index of known and/or trusted SaaS applications. The firewall 114 can detect the SaaS application in accordance with a security policy, for instance by determining metadata of the SaaS application does not comply with the security policy and, in response, can communicate the identifier 106 to the generator 101.

At stage C, the generator 101 generates search engine queries for each security feature and the SaaS application "App1" such as example search engine query 110. Example security engine query 110 is the following:

App1 authentication MFA two-factor 2FA multi-factor.

This example comprises the identifier 106 of the SaaS application "App1" as well as tokens determined to be relevant to the MFA security feature by the tf-idf analyzer 103. Search engine queries for other security features have the same identifier 106 "App1" and different tokens thereafter determined as relevant to each respective security feature. The generator 101 communicates search engine queries for each security feature including the example search engine query 110 to a search engine 105 over the Internet. The search engine 105 returns URLs 112 corresponding to each search engine query. The generator 101 can specify to the search engine 105 a number of URLs to return in response to each search query and/or a metric for relevance of URLs above which to return URLs for each search engine query that can be tuned during training of the generator 101 for optimally relevant URLs.

At stage D, a URL ranker 107 receives the URLs 112 and ranks them according to how likely they are to correspond to webpages and/or content describing the corresponding security feature for the SaaS application. The URL ranker 107 determines whether each of the URLs 112 contains a path, contains the SaaS application identifier "App1", and contains tokens with high tf-idf statistics for the corresponding security feature. The URL ranker 107 can have the tokens with high tf-idf statistics stored in local memory or can periodically communicate with the security feature/token database 104 for these tokens as they are identified and updated. The URL ranker 107 assigns a score to each of the URLs 112 based on whether the URLs 112 contain a path, contain the SaaS application identifier "App1", and contain tokens with high tf-idf statistics based on importance of each of these criteria. For instance, a weight of 1 can be added to a URL score if it contains "App1", 0.5 if it contains a path, and the tf-idf statistic of any tokens in the URL corresponding to the security feature can be added to the score (with the score starting at 0). The URL ranker 107 ranks the URLs according to their scores.

At stage E, the generator 101 receives confidence values 120 and HTML content 130 and matches tokens for each security feature in the security feature/token database 104 with the HTML content 130 to identify sentences describing implementation of security features. The confidence values 120 and HTML content are obtained as outputs of a machine learning model as will be described in further detail in reference to FIG. 2. The generator 101 determines which security features are implemented by the SaaS application according to corresponding confidence values in the confidence values 120, e.g., security features with at least one confidence value above a threshold. In some embodiments, the confidence values 120 can instead indicate which security features are implemented. For each implemented security feature, the generator 101 queries the security feature/token database 104 for high importance tokens for that security feature. The generator 101 then matches each of the returned tokens with sentences in the HTML content 130. The HTML content 130 can be labelled by security feature, and the generator 101 can perform an exact or approximate match such as substring search in the HTML content 130 to identify sentences that describe implementation of each security feature. An example sentence 140 that describes implementation of MFA is the following:

App1 features strong multi-factor authentication . . . .

The generator 101 then communicates sentences identified for each security feature in association with the corresponding security features for display to a user of the SaaS application.

FIG. 2 is a schematic diagram of an example system for determining confidence values for implementation of security features by a detected applications using intelligently queried and ranked URLs and a machine learning model. A security feature implementation prediction system (system) 290 comprises the generator 101 that generates queries for security features based on an identifier 200 of a detected SaaS application. The generator 101 communicates URLs returned from the queries to the URL ranker 107 that ranks and communicates top-ranked URLs to a respective destination via the Internet 201. A HyperText Markup Language (HTML) parser 203 and natural language processor 205 preprocess HTTP responses from over the Internet 201 for inputting to a trained security feature confidence prediction model (trained model) 207 that generates confidence values that the detected SaaS application implements each of the security features. Data throughout FIG. 2 are labelled with indices 1 . . . N. This indicates that these data each correspond to a distinct one of N security features. Each operation for each security feature can occur concurrently.

FIG. 2 is also annotated with a series of letters A-E. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, the firewall 114 detects the SaaS application corresponding to the identifier 200 and communicates the identifier 200 to the generator 101. The generator 101 retrieves tokens for each security feature from a database (not depicted) that have high tf-idf statistics in documents related to each security feature and uses the tokens for each security feature in combination with the identifier 200 to generate search engine queries 222-1 . . . 222-N for each of the N security features. Example search engine queries 260 comprise the following:

App1 SF1Token1 . . .
App1 SF2Token1 . . .
. . .
App1 SFNToken1 . . . .

"App1" is an example identifier of the detected SaaS application and "SF1Token1", "SF2Token1", and "SFNToken1" are first tokens with high tf-idf statistics for security features 1, 2, and N, respectively. The tokens in each of the search engine queries 222-1 . . . 222-N can be ordered arbitrarily or by decreasing tf-idf statistics.

At stage B, the generator 101 communicates the search engine queries 222-1 . . . 222-N to the search engine 105 over the Internet 201. The generator 101 can specify a threshold number of URLs to return from each query or a threshold confidence for URLs to return, for instance via an Application Programming Interface (API) of the search engine 105. The search engine 105 returns sets of URLs 224-1 . . . 224-N for each of the search engine queries 222-1 . . . 222-N (i.e., for each of the security features and the SaaS application) that the generator 101 communicates to the URL ranker 107.

At stage C, the URL ranker 107 ranks URLs in each of the sets of URLs 224-1 . . . 224-N. The URL ranker 107 ranks URLs within each set substantially similarly to as described above in reference to FIG. 1. To illustrate, the URL ranker 107 assigns a score to each URL based on whether they contain the identifier 200, whether they contain a path, and whether they contain tokens with high tf-idf statistics for corresponding security features. URLs within each of the sets of URLs 224-1 . . . 224-N are ranked according to their scores and the URL ranker 107 adds highest-ranking URLs within each set to top-ranked URLs 226-1 . . . 226-N. The cutoff for URLs within each set can be a fixed number of URLs, a threshold score for URLs, etc. and can depend on available computing resources. The URL ranker 107 communicates HTTP GET requests for each of the top-ranked URLs 226-1 . . . 226-N to the Internet 201 (e.g., using a domain name system resolver) to get content corresponding to each URL. Alternatively, the URL ranker 107 can communicate top-ranked URLs 226-1 . . . 226-N to a web crawler (not depicted) that updates its crawling policy accordingly.

At stage D, the HTML parser 203 receives HTTP responses 240-1 . . . 240-N from over the Internet 201 (or a web crawler crawling the Internet 201) and extracts content from each HTTP response. The HTML parser 203 can be off-the-shelf, 3$^{rd}$ party software. The HTML parser 203 can extract HTML from the HTTP responses 240-1 . . . 240-N and remove header fields. The HTML parser 203 can additionally generate a parse tree from the HTML and extract content within tags corresponding to nodes of the parse tree. The HTML parser 203 communicates the extracted HTML content 228-1 . . . 228-N to the natural language processor 205.

The natural language processor 205 applies various preprocessing steps to the HTML content 228-1 . . . 228-N to generate inputs 230-1 . . . 230-N. For instance, the natural language processor 205 can split camel case words into separate tokens, converting to lowercase, can remove punctuation, alphanumeric characters, URLs, etc., can apply an algorithm such as the Viterbi algorithm to detect words without whitespace characters between them, and can detect foreign language tokens and translate foreign language tokens using neural networks. Finally, the natural language processor 205 can convert resulting tokens into numerical vectors with an algorithm such as the word2vec algorithm. Other natural language processing techniques can be used depending on architecture of the trained model 207. The natural language processor 205 can store the inputs 230-1 . . . 230-N in a database (not depicted) for future training and updating of the trained model 207.

At stage E, the trained model 207 receives the inputs 230-1 . . . 230-N for input and outputs confidence values 232 that the trained model 207 communicates to the firewall 114 for corrective action. Each of the inputs 230-1 . . . 230-N corresponds to one of the HTTP responses 240-1 . . . 240-N and, thus, corresponds to a security feature/URL. Although the inputs 230-1 . . . 230-N are specific to each security feature, for each input the trained model 207 generates confidence values for every security feature as output. The trained model 207 is trained on documents used for generating tf-idf statistics for each security feature labeled with their corresponding security features.

The trained model 207 can perform further analysis on the confidence values 232. For instance, the trained model 207 (or other component of FIG. 2) can determine which security features have confidence values for every one of the inputs 230-1 . . . 230-N below a threshold confidence value, which is indicative that a security feature is not implemented by the SaaS application, and which security features have at least one confidence value above a threshold confidence value, which is indicative that a security feature is implemented by the SaaS application. Other criteria, such as criteria for averages of confidence values and requiring multiple confidence values above the threshold, can be used. The trained model 207 can further generate a security score for the SaaS application as a weighted average of maximal confidence values for each security feature. The firewall 114 can perform corrective action based on a low security score or security features indicated as not being implemented, for instance by generating a user alert that indicates security features that are not implemented, generating a user alert that indicates the security score, terminating processes associated with the SaaS application at the endpoint device, etc.

The trained model 207 additionally communicates confidence values 232 and HTML content 228-1 . . . 228-N to the generator 101 to identify sentences in the HTML content 228-1 . . . 228-N that describe implementation of each implemented security feature for the SaaS application. The generator 101 matches tokens with high importance for each security feature to tokens in sentences of corresponding HTML content in the HTML content 228-1 . . . 228-N for implemented security features to identify the sentences. The generator 101 communicates the sentences in association with corresponding implemented security features to the firewall 114, and the firewall 114 can generate a user display indicating implemented security features, confidence values for implementation, and identified sentences that describe implementation. This allows for interpretability of predictions made by the trained model 207.

Figure 3:
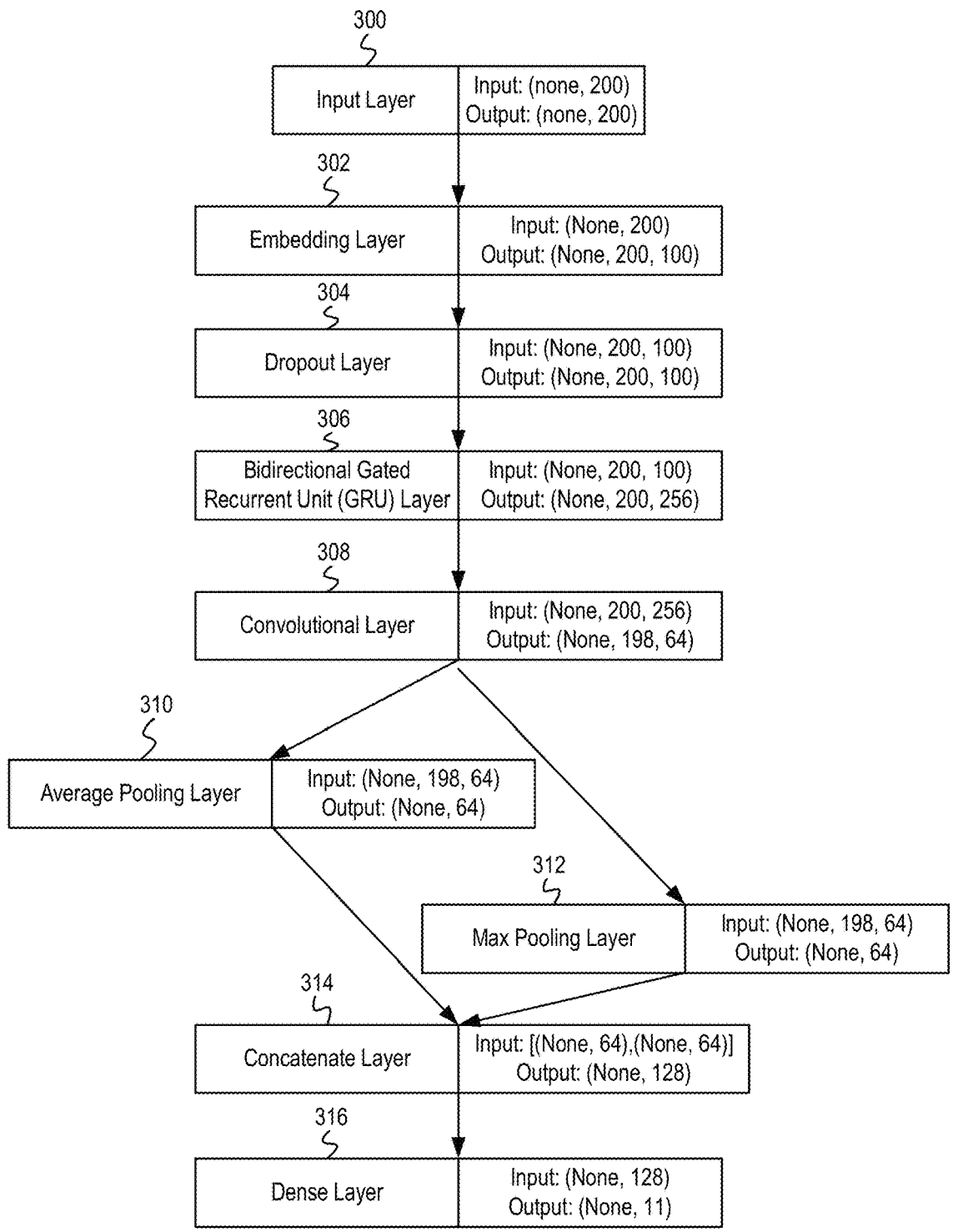
FIG. 3 is a schematic diagram of an example neural network architecture for a security feature confidence prediction model.

FIG. 3 is a schematic diagram of an example neural network architecture for a security feature confidence prediction model. An input layer 300 comprises inputs of size 1×200 and outputs of size 1×200 and feeds into an embedding layer 302. The embedding layer 302 comprises inputs of size 1×200 and outputs of size 1×200×100 and feeds into a dropout layer 304. The dropout layer 304 comprises inputs of size 1×200×100 and outputs of size 1×200×100 and feeds into a bidirectional gated recurrent unit (GRU) layer 306. The bidirectional GRU layer 306 comprises inputs of size 1×200×100 and outputs of size 1×200×256 and feeds into a convolutional layer 308. The convolutional layer 308 comprises inputs of size 1×200×256 and outputs of size 1×198×64 and feeds into an average pooling layer 310 and a max pooling layer 312. The average pooling layer has inputs of size 1×198×64 and outputs of size 1×64 and feeds into a concatenate layer 314. The max pooling layer 312 comprises inputs of size 1×198×64 and outputs of size 1×64 and feeds into the concatenate layer 314. The concatenate layer 314 concatenates the 1×64 outputs of the average pooling layer 310 and the max pooling layer 312 into a concatenated output of size 1×128 and feeds into a dense layer 316. The dense layer 316 comprises inputs of size 1×128 and outputs of size 1×11.

The architecture provided in FIG. 3 is exemplary and can vary with respect to type, size, and order of layers depending on desired architecture, the amount of available training data, desired level of overfitting/underfitting, available computing resources, number of tracked security features, etc. The final output at the dense layer 316 of size 1×11 corresponds to 11 security features, and this size can vary depending on how many security features are predicted for implementation. The bidirectional GRU layer 306 allows for forward and backward analysis of inputs which is conducive to analysis of natural language content. Other types of layers used in natural language processing such as long short-term memory layers can be implemented. While the input layer 300 has a fixed size, for other types of preprocessing input layers with dynamic size can be implemented.

FIGS. 4-7 are flowcharts of example operations for implementing a pipeline that generates search engine queries for security features of a detected SaaS application based on high importance tokens, intelligently ranks URLs returned from each search engine query, classifies content returned from top-ranked URLs to determine confidence of implementation of each security feature, and identifying sentences describing implementation of each implemented security feature. The example operations are described with reference to a security feature implementation prediction system for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 4:
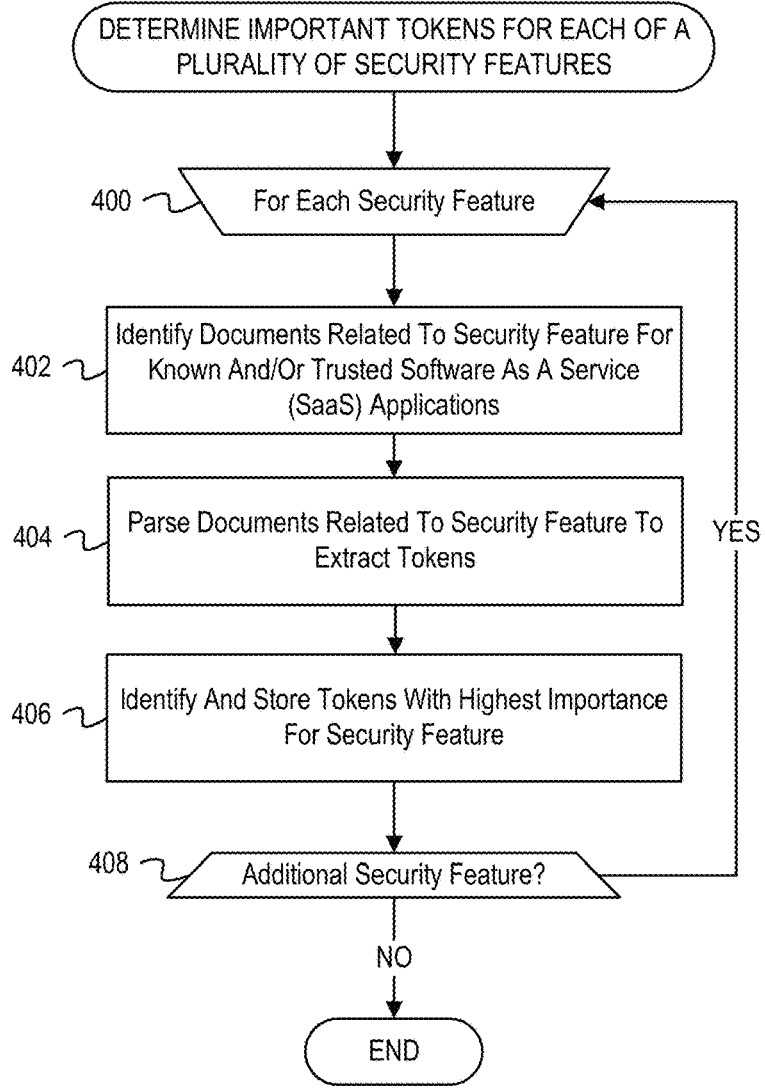
FIG. 4 is a flowchart of example operations for determining important tokens for each of a plurality of security features.

FIG. 4 is a flowchart of example operations for determining important tokens for each of a plurality of security features. Importance of tokens is determined according to statistical significance of tokens in documents relating to each security feature for SaaS applications with known implementations of the security feature. At block 400, a security feature implementation prediction system (system) begins iterating through security features. While depicted as sequential in FIG. 4, operations for each security feature can occur concurrently across security features as documents for respective security features are identified and processed.

At block 402, the system identifies documents related to the security feature for known and/or trusted SaaS applications. The identification can be by a domain level expert with knowledge of popular/trusted SaaS applications and which security features they implement. The documents can be scraped from the Internet based on identification of URLs corresponding to the documents. In some embodiments, identification of documents related to the security feature is automated using a trained machine learning model and an index of popular/trusted SaaS applications.

At block 404, the system parses the documents related to the security feature to extract tokens. The system performs natural language processing steps such as splitting camel case words, converting to lower case, detecting and translating foreign language tokens, removing blended words that are adjacent without white spaces with the Viterbi algorithm, etc. The result of parsing is tokens corresponding to content of the documents.

At block 406, the system identifies and stores tokens with highest importance for the security feature. Importance is measured by statistical significance of occurrence of the tokens in the parsed documents. An exemplary statistic is the tf-idf statistic of tokens in the document, with the tokens with highest tf-idf statistics having highest importance. Other metrics of statistical significance can be used. Once each token is ranked according to importance, the system can determine the top N tokens as those with highest importance for some tunable N (e.g., N=5) or can have a threshold score above which to identify tokens with highest importance. In some embodiments, when there are insufficient tokens with highest importance for the security feature, the system identifies, scrapes, and parses additional documents related to the security feature and recomputes statistical significance of tokens until a sufficient number of high importance tokens are identified and stored. Highest importance tokens are stored in association with an identifier of the security feature for future retrieval.

At block 408, the system continues iterating through security features. If there is an additional security feature, flows to block 400. Otherwise, the operations in FIG. 4 are complete.

Figure 5:
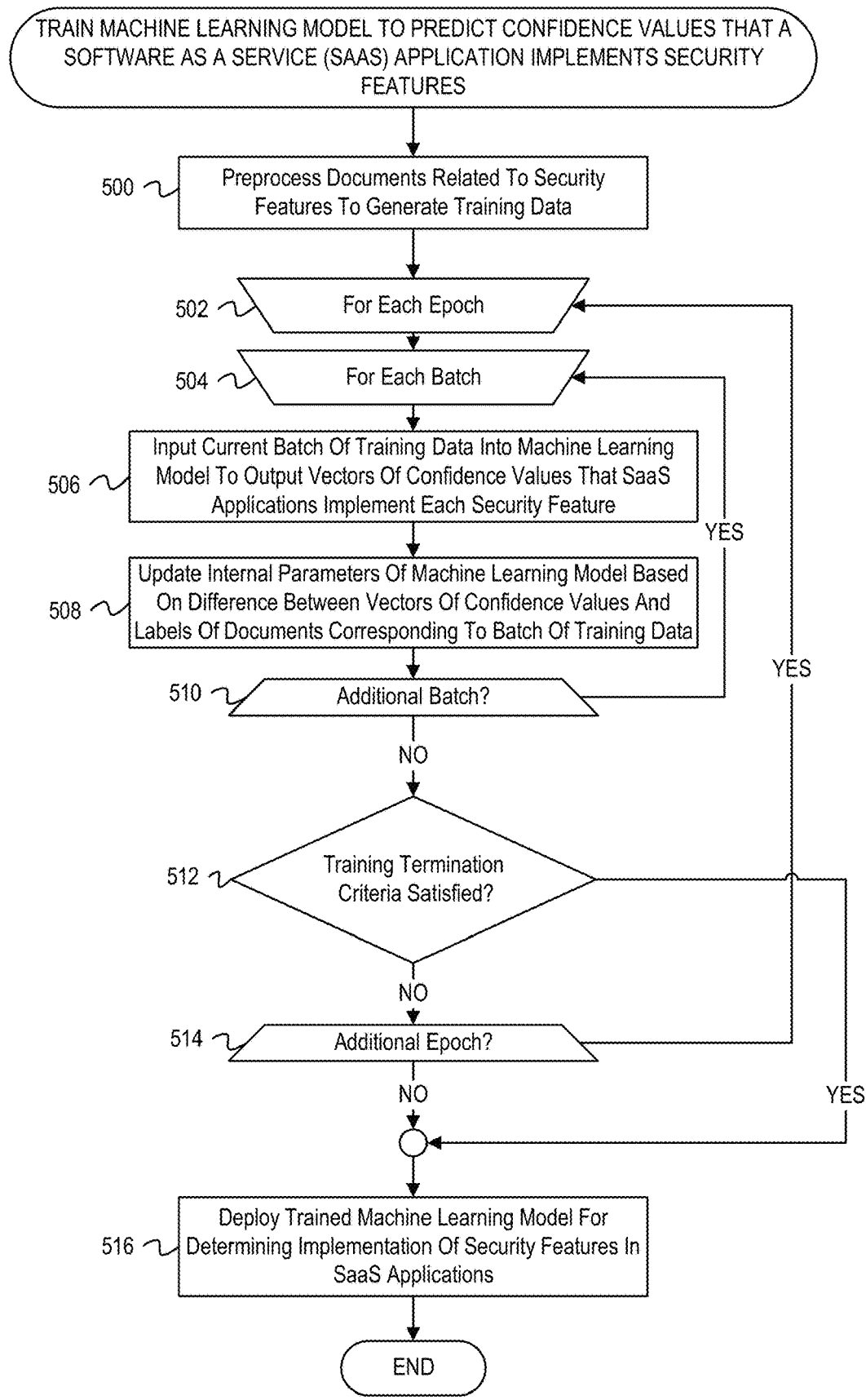
FIG. 5 is a flowchart of example operations for training a machine learning model to predict confidence values that a SaaS application implements security features.

FIG. 5 is a flowchart of example operations for training a machine learning model to predict confidence values that a SaaS application implements security features. At block 500, a security feature implementation prediction system (system) preprocess documents related to security features to generate training data. The system performs various natural language processing steps such as tokenizing the documents, splitting camel case tokens, splitting blended words with an algorithm such as the Viterbi algorithm, removing punctuation and other non-alphabetic American Standard for Information Interchange (ASCII) characters, detecting and translating foreign language tokens, converting natural language tokens to numerical vectors with an algorithm such as the word2vec algorithm, etc. In some embodiments, the documents comprise documents previously tokenized with natural language processing to generate high importance tokens for each security feature, and the system can use the previously tokenized documents with an additional step to convert them to numerical vectors while preserving semantic similarity (e.g., the word2vec algorithm). The system can compress resulting numerical vectors into a fixed length input, for instance using a hashing algorithm. Each resulting training datum (e.g., a fixed length number vector) is associated with a vector of 0/1 labels for whether the SaaS application corresponding to the document implements each security feature with 0 indicating the security feature for that entry is not implemented by the SaaS application and 1 indicating the security feature for that entry is implemented by the SaaS application.

At block 502, the system begins iterating through training epochs, and at block 504 the system begins iterating through batches of training data within each training epoch. The maximal number of training epochs can depend on available computing resources, training data, and desired model accuracy. The batches of training data can be subsampled from the training data uniformly at random at a fixed percentage (e.g., 10% per batch).

At block 506, the system inputs the current batch of training data into a machine learning model to output vectors of confidence values that SaaS applications corresponding to each training datum implement each security feature. Outputs of the machine learning model comprise vectors of values in the interval [0,1], with 0 being lowest likelihood of implementing the corresponding security feature, and 1 being highest likelihood of implementing the corresponding security feature.

At block 508, the system updates internal parameters of the machine learning model based on a difference between vectors of confidence values and labels of documents corresponding to the batch of training data. The updates are generated based on a loss function on multi-label outputs, for instance cross-entropy loss. The loss function is applied using backpropagation to update the internal parameters of the machine learning model.

At block 510, the system continues iterating through batches of training data. If there is an additional batch, flow returns to block 504. Otherwise, flow proceeds to block 512.

At block 512, the system determines whether training termination criteria are satisfied. The training termination criteria can be that training, testing, and/or validation error are sufficiently low, that internal parameters of the machine learning model converge across batches, etc. Additional model evaluations such as k-fold cross validation can be used for evaluating training termination criteria. If the training termination criteria are satisfied, flow skips to block 516. Otherwise, flow proceeds to block 514.

At block 514, the system continues iterating through training epochs. If there is an additional training epoch, flow returns to block 502. Otherwise, flow proceeds to block 516.

At block 516, the system deploys the trained machine learning model for determining implementation of security features in SaaS applications. The trained machine learning model is a final predictive step in a pipeline that involves detecting unknown/untrusted SaaS applications, generating intelligent search engine queries for the SaaS applications and security features, ranking URLs returned from the intelligent search engine queries, scraping content from the high-ranking URLs, and inputting preprocessed content into the trained machine learning model.

Figure 6:
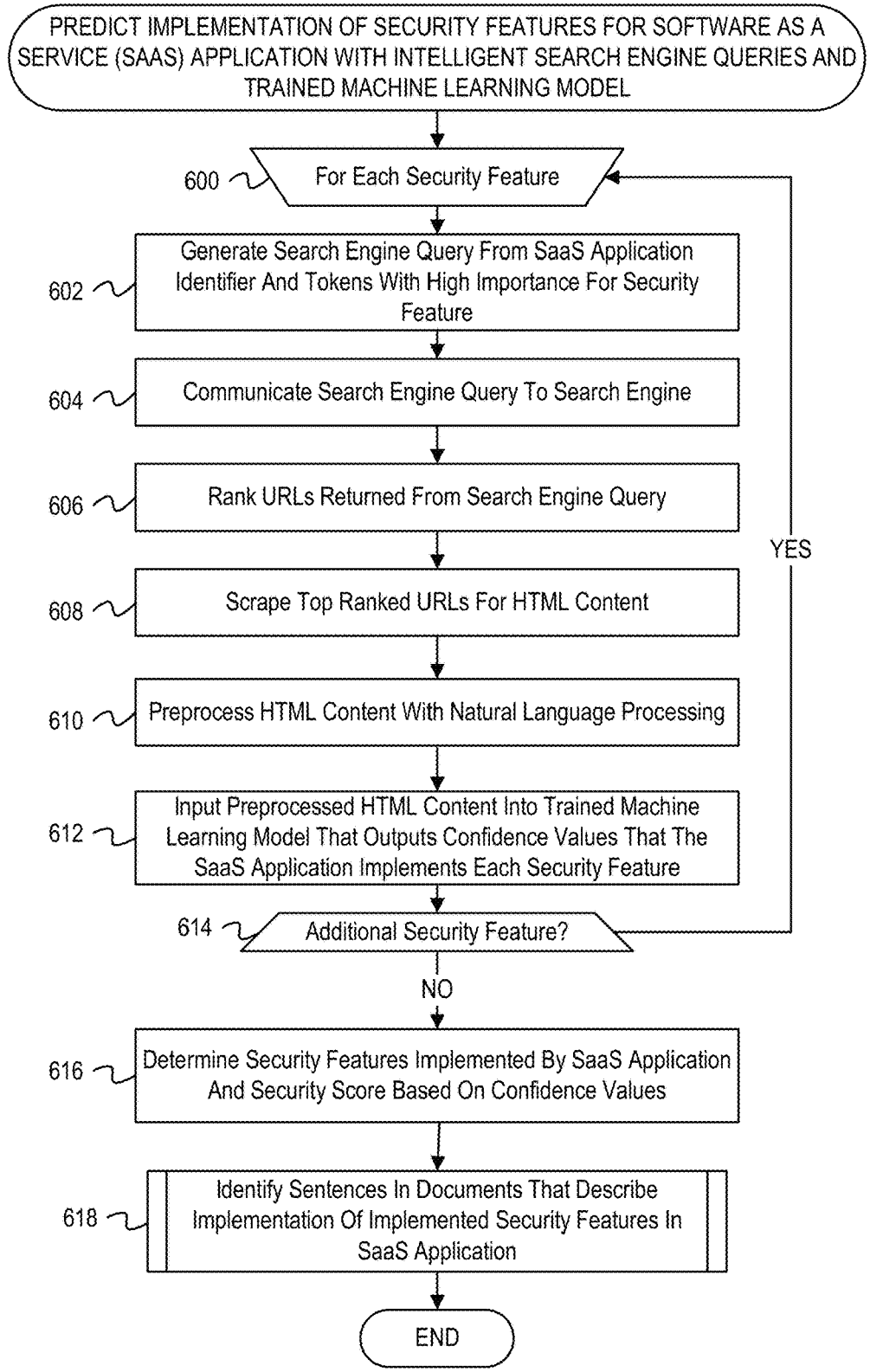
FIG. 6 is a flowchart of example operations for predicting implementation of security features for a SaaS application with intelligent search engine queries and a trained machine learning model.

FIG. 6 is a flowchart of example operations for predicting implementation of security features for a SaaS application with intelligent search engine queries and a trained machine learning model. At block 600, a security feature implementation prediction system (system) begins iterating through security features. The example operations at each iteration are depicted per-security feature for simplicity of presentation. The example operations at each iteration can occur concurrently with operations at other blocks for distinct security features.

At block 602, the system generates a search engine query from an identifier of a SaaS application and tokens with high importance for the security feature. The tokens with high importance for the security feature comprise tokens with statistical significance of occurrence in documents related to the security feature, for instance tokens with high tf-idf statistics in those documents. The query comprises the identifier and the high importance tokens separated by white spaces. Order of the high importance tokens in the search engine query can be according to statistical significance of the tokens with most significant tokens occurring first.

At block 604, the system communicates the search engine query to a search engine. The system can further specify a maximal number of search results to return and/or a confidence level for search results to return. The system can communicate the search engine query and any further search parameters via an API of the search engine.

At block 606, the system ranks URLs returned from the search engine query. The system assigns each URL a score according to whether the URL contains a path, contains the identifier of the SaaS application, contains tokens with high importance for the security feature, etc. The score is a weighted sum of binary (0/1) variables indicating whether each of these are present in the URL, with more important fields (e.g., the identifier of the SaaS application) having higher weights.

At block 608, the system scrapes top-ranked URLs for HTML content. The system can determine the top-ranked URLs according to a threshold number of top-ranked URLs from the list of ranked URLs and/or as URLs with scores above a threshold score. The system can use a $3^{rd}$ party web scraper and/or web crawler to retrieve the HTML content for each top-ranked URL.

At block 610, the system preprocesses the HTML content with natural language processing. The system parses the HTML content to generate a parse tree and content within each set of tags related to content. The system then preprocesses the HTML content by extracting tokens, replacing non-alphabetical ASCII tokens, splitting camel case tokens, detecting and separating blended tokens, detecting and translating foreign language tokens, and converting tokens to numerical vectors while preserving semantic similarity.

At block 612, the system inputs the preprocessed HTML content into a trained machine learning model that outputs confidence values that the SaaS application implements each security feature. While the preprocessed HTML content corresponds to URLs for the security feature and the SaaS application, the trained machine learning model is trained to learn security feature context from HTML content across all security features. Thus, the trained machine learning model can predict confidence values for more than just the current security feature. HTML content for each URL in the top-ranked URLs input to the trained machine learning model generates a separate vector of confidence values for implementation of each security feature by the SaaS application.

At block 614, the system continues iterating through security features. If there is an additional security feature, flow returns to block 600. Otherwise, flow proceeds to block 616.

At block 616, the system determines security features that are implemented by the SaaS application and a security score for the SaaS application based on the confidence values. The system can determine security features that are implemented as security features that have a confidence value above a threshold confidence value in one of the vectors of confidence values output by the trained machine learning model. The threshold confidence values can vary by security feature, for instance when certain security features require greater confidence of implementation. Alternatively, the system can apply other criteria, for instance criteria involving average or top-N confidence values for each security feature. The security score can be computed as a weighted average of maximal confidence values for each security feature, with each maximal value weighted by importance of the corresponding security feature for SaaS application security.

At block 618, the system identifies sentences in documents that describe implementation of implemented security features in the SaaS application. The system identifies sentences for each security feature by matching important tokens for that security feature with sentences in HTML content for that security feature. The firewall can further indicate the identified sentences in association with each implemented security feature and confidence values of implementations. The operations at block 618 are described in greater detail in reference to FIG. 7.

Figure 7:
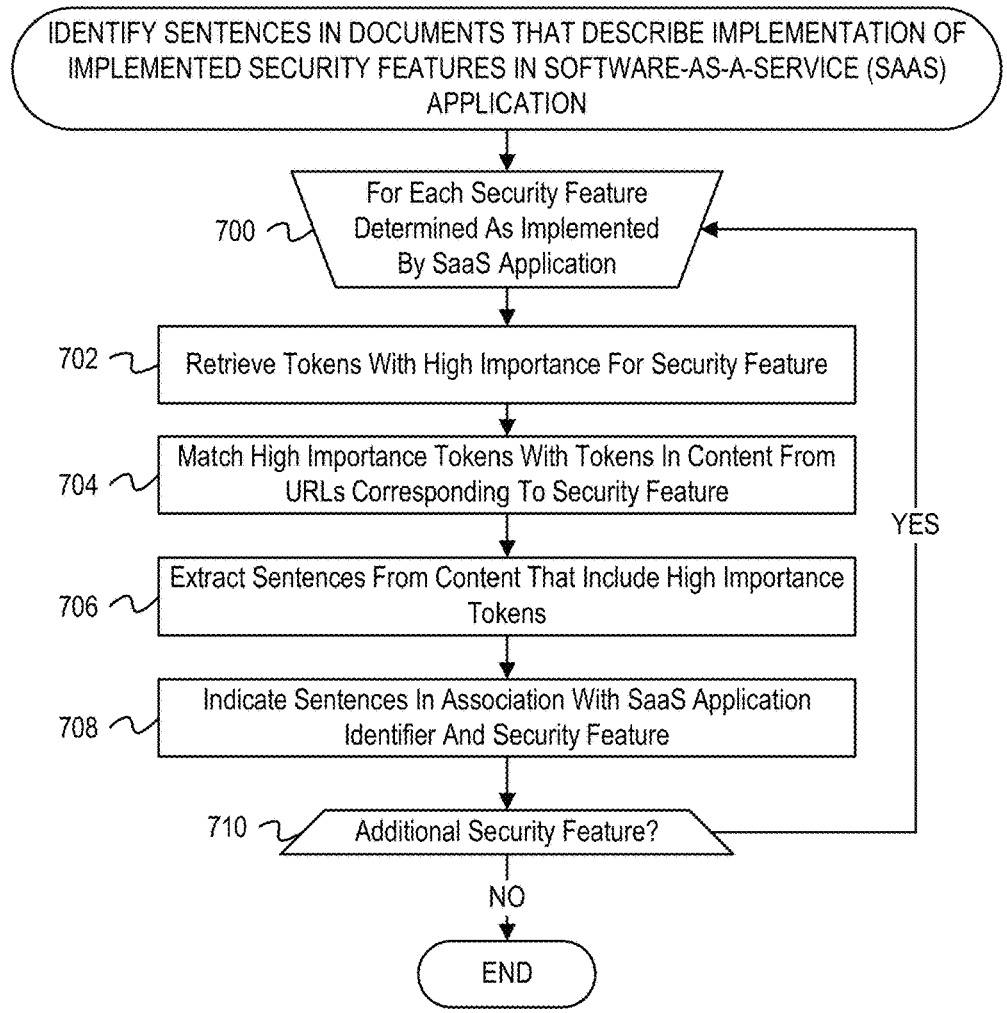
FIG. 7 is a flowchart of example operations for identifying sentences in documents that describe implementation of implemented security features for a SaaS application.

FIG. 7 is a flowchart of example operations for identifying sentences in documents that describe implementation of implemented security features for a SaaS application. At block 700, a security feature implementation prediction system (system) begins iterating through security features determined to be implemented by a SaaS application.

At block 702, the system retrieves tokens with high importance for the security feature. The high importance tokens can be tokens determined to have statistical significance of occurrence in documents related to the security feature, for instance tokens with high tf-idf statistics in those documents. The documents can be documents that describe implementation of the security feature for known/trusted applications, for instance as identified by a domain-level expert.

At block 704, the system matches the high importance tokens with tokens in content from URLs corresponding to the security feature. The URLs corresponding to the security feature comprise top-ranked URLs returned from a search engine query corresponding to the security feature that was generated from an identifier of the SaaS application and the high importance tokens for the security feature. The system can perform a substring search in the content for each of the high importance tokens or can perform other algorithms for exact or approximate string matching.

At block 706, the system extracts sentences from the content that include the high importance tokens. For each matched token, the system can identify a corresponding sentence according to known sentence syntax such as a starting word that begins with a capital ASCII character and an ending word that precedes a "." character. The system can deduplicate duplicate sentence that are extracted multiple times due to comprising multiple high importance tokens for the security feature.

At block 708, the system indicates the sentences in association with an identifier of the SaaS application and the security feature. The identified/indicated sentences can subsequently be used by a user of a firewall to interpret how the security feature was determined as being implemented and to detect potential flaws in the pipeline for predicting implementation of security features.

At block 710, the system determines whether there is an additional security feature. If there is an additional security feature, flow returns to block 700. Otherwise, the operations depicted in FIG. 7 are complete.

Variations

The above operations for predicting implementation of security features using intelligent search engine queries, URL ranking, and a trained machine learning model are described with reference to SaaS applications. These operations can be similarly performed for any target entity having security features and publicly available documentation, datasheets, etc. that are accessible over the Internet. Instances of operations involving an identifier of a SaaS application can similarly be performed by replacing the SaaS application identifier with an identifier of any such target entity.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 602, 604, 606, 608, 610, and 612 and other operations performed for each security feature can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 8:
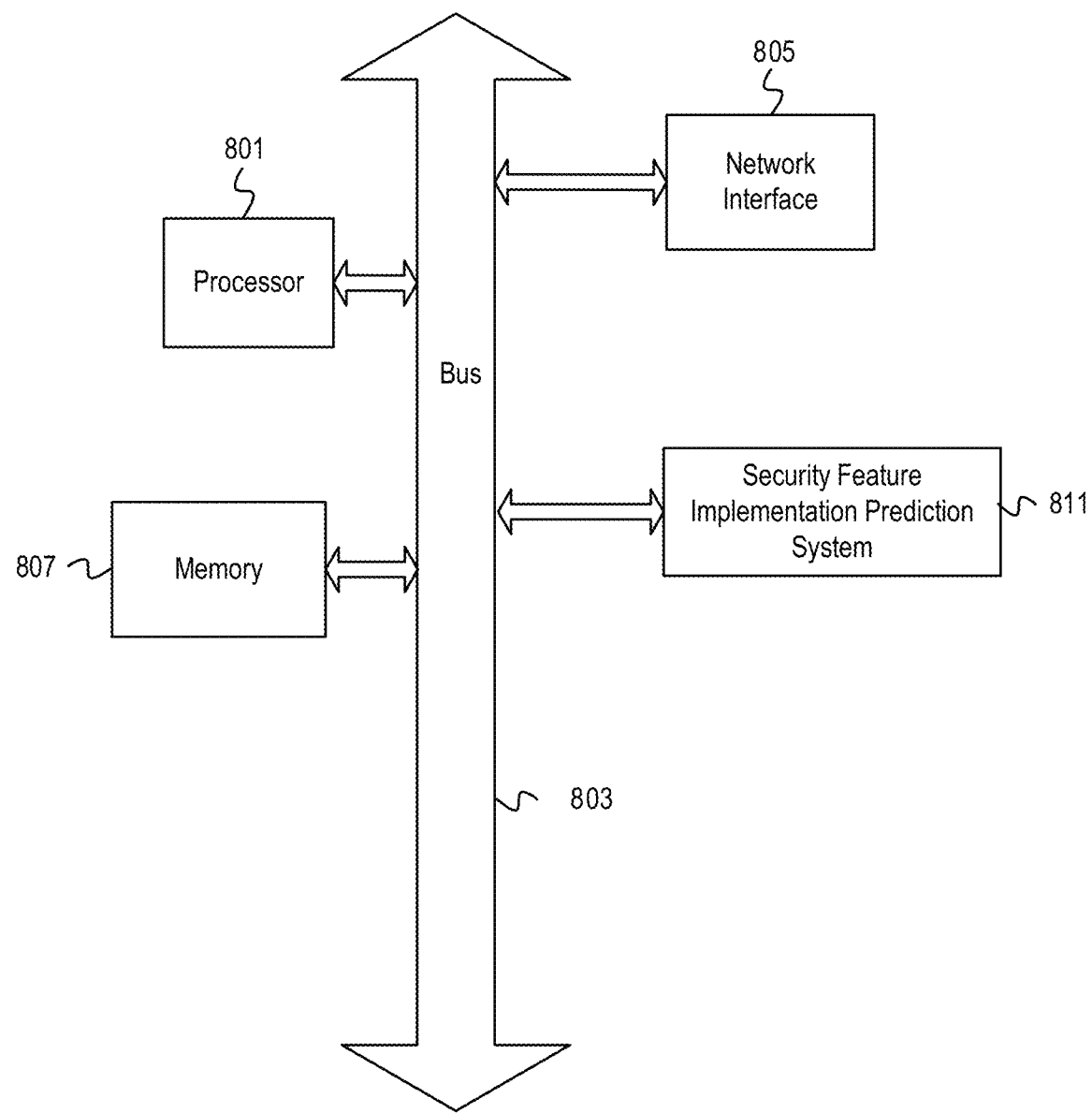
FIG. 8 depicts an example computer system with a security feature implementation prediction system.

FIG. 8 depicts an example computer system with a security feature implementation prediction system. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes a security feature implementation prediction system 811. The system 811 identifies high importance tokens in documents related to each of multiple security features and, based on a detected SaaS application, generates search engine queries for each security feature using an identifier of the SaaS application and the high importance tokens. The system ranks URLs returned from the search engine queries and preprocesses content returned from the top-ranked URLs to input to a trained machine learning model to output confidence values that the SaaS application implements each security feature. The system then determines which security features the SaaS application implements and identifies sentences describing implementation of the security features in corresponding content returned from top-ranked URLs. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

The invention claimed is:

1. A method comprising:
generating a plurality of search engine queries for corresponding ones of a plurality of security features and a target entity, wherein generating the plurality of search engine queries is based, at least in part, on importance of tokens extracted from documents describing security features;
for each search engine query of the plurality of search engine queries, identifying a subset of a plurality of Uniform Resource Locators (URLs) returned responsive to the search engine query with highest likelihoods of relating to a security feature corresponding to the search engine query and to the target entity; and generating feature values based on parsing content scraped from the subset of the plurality of URLs; and inputting the feature values into a trained machine learning model to obtain from output, for each feature value, confidence values that the target entity implements each of the plurality of security features.

2. The method of claim 1, wherein each of the plurality of search engine queries comprises an identifier of the target entity and one or more tokens for the corresponding security feature that have statistically significant occurrence in one or more documents for the security feature.

3. The method of claim 2, wherein the one or more tokens with statistically significant occurrence comprise one or more tokens with highest term frequency-inverse document frequency statistics in the one or more documents for the corresponding security feature.

4. The method of claim 1, wherein identifying the subset of the plurality of URLs returned responsive to the search engine query comprises, scoring each URL of the plurality of URLs according to at least one of the URL comprising an identifier of the target entity, the URL comprising tokens with high importance for the corresponding security feature, and the URL comprising a path; and identifying the subset of the plurality of URLs as those of the plurality of URLs with highest scores.

5. The method of claim 1, wherein generating feature values based on parsing content scraped from the plurality of URLs comprises:

scraping the plurality of URLs for the content;

parsing the scraped content; and generating the feature values from the parsed content with natural language processing.

6. The method of claim 1, further comprising:

identifying a subset of the plurality of security features not having a confidence value output by the trained machine learning model above a threshold confidence value; and indicating the subset of the plurality of security features and the target entity for security vulnerability.

7. The method of claim 1, further comprising generating a security score for the target entity based, at least in part, on the confidence values output by the trained machine learning model.

8. The method of claim 1, wherein the target entity comprises a Software-as-a-Service application.

9. The method of claim 1, further comprising:

determining that the target entity implements a first security feature of the plurality of security features based, at least in part, on the confidence values;

identifying one or more tokens in the content from the plurality of URLs for a first search engine query corresponding to the first security feature, wherein the one or more tokens comprise tokens with high importance for the first security feature; and indicating one or more sentences corresponding to the one or more tokens in the content as describing the target entity implementing the first security feature.

10. A non-transitory machine-readable medium having program code stored thereon, the program code comprising instructions to:

based on detecting a target entity with unknown confidence of implementing one or more of a plurality of security features, generate a plurality of search engine queries corresponding to the plurality of security features and the target entity, wherein each of the plurality of search engine queries comprises tokens with high importance for corresponding security features in the plurality of security features and an identifier of the target entity;

for each search engine query of the plurality of search engine queries, identify a subset of a plurality of URLs returned responsive to the search engine query with highest likelihood of relating to a security feature corresponding to the search engine query and the target entity;

scrape the subset of the plurality of URLs for content;

preprocess the content to generate feature values for each of the plurality of URLs; and input the feature values for each of the plurality of URLs into a trained machine learning model to obtain from output confidence values that the target entity implements each of the plurality of security features; and based on the confidence values output by the trained machine learning model, indicate the target entity as implementing or not implementing each of the plurality of security features.

11. The non-transitory machine-readable medium of claim 10, wherein the instructions to identify the subset of the plurality of URLs with highest likelihood of relating to a security feature corresponding to the search engine query and the target entity comprise instructions to:

score each URL of the plurality of URLs according to at least one of the URL comprising an identifier of the target entity, the URL comprising tokens with high importance for the corresponding security feature, and the URL comprising a path; and identify the subset of the plurality of URLs as those of the plurality of URLs with highest scores.

12. The non-transitory machine-readable medium of claim 10, wherein the tokens with high importance for corresponding security features in the plurality of security features comprise tokens with highest term frequency-inverse document frequency statistics in documents for the corresponding security features.

13. The non-transitory machine-readable medium of claim 10, wherein the instructions to preprocess the content to generate feature values for each of the plurality of URLs comprise instructions to preprocess the content with natural language processing.

14. The non-transitory machine-readable medium of claim 10, wherein the program code further comprises instructions to:

identify a subset of the plurality of security features not having a confidence value output by the trained machine learning model above a threshold confidence value; and indicate the subset of the plurality of security features and the target entity for security vulnerability.

15. The non-transitory machine-readable medium of claim 10, wherein the program code further comprises instructions to generate a security score for the target entity based, at least in part, on the confidence values output by the trained machine learning model.

16. The non-transitory machine-readable medium of claim 10, wherein the program code further comprises instructions to:
  determine that the target entity implements a first security feature of the plurality of security features based, at least in part, on the confidence values;
  identify one or more tokens in the content from the plurality of URLs for a first search engine query corresponding to the first security feature, wherein the one or more tokens comprise tokens with high importance for the first security feature; and
  indicate one or more sentences corresponding to the one or more tokens in the content as describing the target entity implementing the first security feature.

17. An apparatus comprising:
  a processor; and
  a machine-readable medium having instructions stored thereon that are executable by the processor to cause the apparatus to,
  for each security feature of a plurality of security features,
    identify one or more documents comprising content related to the security feature; and
    identify one or more tokens in the one or more documents with high importance for the security feature, wherein the instructions executable by the processor to cause the apparatus to identify the one or more tokens comprise instructions to identify the one or more tokens according to statistical occurrence of tokens in the one or more documents;
  based on detecting a target entity with unknown confidence of implementing one or more of a plurality of security features, generate a plurality of search engine queries for the plurality of security features, wherein the plurality of search engine queries comprises the one or more tokens with high importance for corresponding security features; and
  input feature values generated from content for a first plurality of Uniform Resource Locators (URLs) into a trained machine learning model to obtain from output confidence values that the target entity implements each of the plurality of security features, wherein the first plurality of URLs is at least a subset of a second plurality of URLs returned from the plurality of search engine queries.

18. The apparatus of claim 17, wherein the machine-readable medium further has stored thereon instructions executable by the processor to cause the apparatus to:
  score each URL of the second plurality of URLs returned from the plurality of search engine queries according to at least one of the URL comprising an identifier of the target entity, the URL comprising tokens with high importance for the corresponding security feature, and the URL comprising a path, wherein the second plurality of URLs comprises the first plurality of URLs; and
  identify the first plurality of URLs as those of the second plurality of URLs with highest scores.

19. The apparatus of claim 17, wherein the one or more tokens in the one or more documents with high importance for the security feature comprise tokens with highest term frequency-inverse document frequency statistics in the one or more documents.

20. The apparatus of claim 17, wherein the machine-readable medium further has stored thereon instructions executable by the processor to cause the apparatus to:
  scrape the first plurality of URLs for the content; and
  preprocess the content with natural language processing to generate the feature values.

21. The apparatus of claim 17, wherein the machine-readable medium further has stored thereon instructions executable by the processor to cause the apparatus to:
  identify a subset of the plurality of security features not having a confidence value output by the trained machine learning model above a threshold confidence value; and
  indicate the subset of the plurality of security features and the target entity for security vulnerability.

22. The apparatus of claim 17, wherein the machine-readable medium further has stored thereon instructions executable by the processor to cause the apparatus to generate a security score for the target entity based, at least in part, on the confidence values output by the trained machine learning model.

23. The apparatus of claim 17, wherein the machine-readable medium further has stored thereon instructions executable by the processor to cause the apparatus to:
  determine that the target entity implements a first security feature of the plurality of security features based, at least in part, on the confidence values;
  identify one or more tokens in the content from the plurality of URLs for a first search engine query corresponding to the first security feature, wherein the one or more tokens comprise tokens with high statistical occurrence in the one or more documents for the first security feature; and
  indicate one or more sentences corresponding to the one or more tokens in the content as describing the target entity implementing the first security feature.

* * * * *